US006538088B1

(12) United States Patent
Leblanc et al.

(10) Patent No.: US 6,538,088 B1
(45) Date of Patent: Mar. 25, 2003

(54) METHODS FOR MAKING POLYMERS FROM N-VINYL ACETAMIDE MONOMER

(75) Inventors: Jean-Pierre Leblanc, Somerville, NJ (US); Rama S. Chandran, Bridgewater, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/259,163

(22) Filed: Feb. 26, 1999

Related U.S. Application Data

(63) Continuation-in-part of application No. 08/837,232, filed on Apr. 10, 1997, now abandoned, which is a continuation-in-part of application No. 08/794,959, filed on Feb. 4, 1997, now abandoned.

(51) Int. Cl.[7] .................................................. C08J 26/00
(52) U.S. Cl. .................... 526/303.1; 526/213; 526/216; 526/227; 526/307.1; 526/307.3; 526/310
(58) Field of Search ................................. 526/213, 227, 526/216, 303.1, 307.1, 307.3, 310

(56) References Cited

U.S. PATENT DOCUMENTS

| 2,628,224 A | | 2/1953 | Cairns et al. | 260/89.7 |
| 4,018,826 A | | 4/1977 | Gless et al. | 260/583 P |
| 4,713,236 A | * | 12/1987 | Hoover et al. | 424/70 |
| 4,758,641 A | * | 7/1988 | Hsu | 526/208 |
| 4,942,259 A | | 7/1990 | Parris et al. | 564/187 |
| 4,956,430 A | * | 9/1990 | Tazi | 526/195 |

FOREIGN PATENT DOCUMENTS

| CA | 2040601 | 10/1991 | | E21B/43/22 |
| EP | 0870782 | * 10/1988 | | |
| JP | 5-97931 | 4/1993 | | C08F/2/20 |
| JP | 08 81428 | 3/1996 | | C07C/233/05 |
| JP | 08134029 | 5/1996 | | C07C/233/02 |

OTHER PUBLICATIONS

Chemical Engineering, "A Water–Absorbing Polymer that Resists Acids and Bases", Oct. 1996, 103, No. 10, p. 19.

* cited by examiner

Primary Examiner—Tatyana Zalukaeva
(74) Attorney, Agent, or Firm—Karen G. Kaiser

(57) ABSTRACT

The present invention is directed to precipitation polymerization processes for the manufacture of essentially non-crosslinked polymers prepared from N-vinyl acetamide monomer which exhibit reduced levels of residual non-polymerizable contaminants, particularly residual acetamide, the processes including the steps of contacting the N-vinyl acetamide monomer with a polymerization medium containing a diluent selected from ethyl acetate and acetone and a free-radical initiator, under conditions effective to polymerize the N-vinyl acetamide monomer, thereby forming a precipitate of the polymer in the polymerization medium; and isolating the precipitated polymer from the polymerization medium.

15 Claims, No Drawings

METHODS FOR MAKING POLYMERS FROM N-VINYL ACETAMIDE MONOMER

This application is a continuation-in-part of pending U.S. application Ser. No. 08/837,232, filed Apr. 10, 1997 abandoned which in turn is a continuation-in-part of U.S. application Ser. No. 08/794,959, filed Feb. 4, 1997 and now abandoned.

FIELD OF THE INVENTION

The present invention relates to precipitation polymerization processes for making essentially non-crosslinked polymers which are prepared from N-vinyl acetamide monomer and which have reduced levels of non-polymerizable contaminants, particularly acetamide.

BACKGROUND OF THE INVENTION

In processes for making polymers, processes had been utilized to substantially reduce residual monomer levels. For instance, it is known to polymerize a polymer solution/emulsion on a powder bed at high temperature, thereby removing the solvent from the precipitating polymer. The monomer level is reduced by post-polymerizing unreacted monomer. There is no mention of methods for removing non-polymerizable contaminants which may be present in the resultant polymer as an artifact of the monomers and/or processes used to prepare the monomers and polymers. Such contaminants may include, for example, raw materials used to prepare the monomers, intermediates which are formed during manufacture of the monomers and degradation by-products of the manufacture of the monomer. Additionally, non-polymerizable contaminants may be introduced via raw materials used to prepare the polymers, such as the monomers themselves, chain transfer agents, initiators and the like. So while methods for reducing residual monomer levels in polymers generally are known, methods for removing non-polymerizable contaminants from polymers have not been reported.

Polymers having reduced levels of contaminants particularly are desired and/or required for end-use applications such as cosmetics for application to skin, hair care products and pharmaceuticals. Therefore, it would be advantageous to develop a precipitation process which not only results in polymers having low residual monomer levels, but also having low non-polymerizable contaminant levels.

The precipitation processes of the present invention result in polymers which not only have reduced residual monomer levels, but just as important, exhibit significant reduction in the levels of non-polymerizable contaminants such as those discussed herein.

SUMMARY OF THE INVENTION

The present invention is directed to precipitation polymerization processes for the manufacture of essentially non-crosslinked polymers prepared from N-vinyl acetamide monomer, which polymers exhibit reduced levels of non-polymerizable contaminants, particularly acetamide. The process comprises the steps of contacting the N-vinyl acetamide monomer with a polymerization medium comprising a diluent selected from the group consisting of ethyl acetate and acetone and a free-radical initiator, under conditions effective to polymerize the N-vinyl acetamide monomer (NVAM), thereby forming a precipitate of poly(vinyl acetamide) polymer (PVAM) in the polymerization medium; and isolating the precipitated PVAM from the polymerization medium.

DETAILED DESCRIPTION OF THE INVENTION

Methods of making NVAM are known to those skilled in the art and are reported in Japanese publication numbers JP 08 81428 and JP 08 134029. The polymer may be a homopolymer of NVAM or may be an interpolymer prepared from NVAM and at least one vinyl monomer(s) other than the NVAM. Preferably, the interpolymer will be prepared from at least about 10 weight percent of NVAM, with the balance of the vinyl monomer(s). The term "vinyl monomer", as used herein, refers to vinyl monomers which are copolymerizable with the NVAM and expressly excludes the NVAM. Suitable vinyl monomers include, (a) styrene and derivatives thereof, such as $C_1$–$C_{18}$ alkyl, alkoxy, acyl and acyloixy-substituted styrene, and hydroxy and isocyanato substituted styrene, (b) $C_1$–$C_{18}$ alkyl esters of acrylic acid, (c) $C_1$–$C_{18}$ alkyl esters of methacrylic acid, (d) vinyl esters of the formula $CH_2$=CH—OCOR where R is $C_1$–$C_{18}$, (e) alkyl substituted acrylamides and methacrylamides of the formula $CH_2$=CR—$CONR_1R_2$ where R is H or $CH_3$; $R_1$ is H or $C_1$–$C_{12}$ and $R_2$ is $C_1$–$C_{18}$, (f) monoesters and diesters of fumaric, itaconic and maleic acids, (g) vinyl ethers such as methyl vinyl ether, isobutyl vinyl ether and the like, (h) hydroxy-substituted acrylates and methacrylates such as hydroxyethyl acrylate, hydroxypropyl acrylate, hydroxyethyl methacrylate, hydroxypropyl methacrylate and the like, (i) vinyl monomers containing an amine selected from the group consisting of secondary, tertiary and quaternary amines, such as n-vinyl imidazole, t-butylaminoethyl methacrylate (t-BAEM), dimethylaminoethyl methacrylate (DMAEMA), diethylaminoethyl methacrylate (DEAEMA), dimethylaminopropyl methacrylamide (DMAPMA) and the quarternized derivatives thereof such as methacrylatoethyltrimethyl ammonium chloride (MAPTAC), methacrylatoethyltrimethyl ammonium sulfate (MAETAS) and dimethyl diallyl ammonium chloride (DMDAAC), (j) acrylamide, (k) non-alkyl substituted acrylamides such as diacetone acrylamide and (l) cyclic amides such as vinyl pyrrolidone and n-vinyl caprolactam. Preferably, the vinyl comonomer is selected from the group consisting of methyl acrylate, methyl methacrylate, 2-hydroxyethyl acrylate, 2-hydroxyethyl methacrylate, 2-hydroxypropyl acrylate, 2-hydroxypropyl methacrylate, vinyl acetate, oligoethylene glycol monomethacrylate, N-vinyl pyrrolidone and the vinyl monomers containing an amine selected from the group consisting of secondary, tertiary and quaternary amines.

The polymers of the present invention must be readily removable with water in order to be used in applications which require such properties, for example personal care products in general and hair care products in particular which are removable with the use of water or combination of soap and water. Therefore, the polymers prepared according to the present invention are essentially non-crosslinked, as crosslinking of the polymer tends to reduce water solubility and, therefore, water removability. Accordingly, the polymers are not prepared utilizing crosslinking agents comprising polymerizable compounds having at least two unsaturated groups in one molecule at any levels which would result in significantly reduced water removability properties of the polymers. Preferably, the polymers are prepared with less than 0.5 weight percent of such compounds, based on total weight of monomer used to prepare the polymer, more preferably less than 0.2 weight percent, and even more preferably, less than 0.1 weight percent of such compounds. Most preferably, the polymers are prepared in the absence of such crosslinking compounds.

Such agents include, without limitation, N,N'-lower alkylene bisacrylamides, alkylene glycol di(meth)acrylates, polyalkylene glycol di(meth)acrylates, divinyl compounds, and compounds such as those disclosed in U.S. Pat. No. 5,280,095, Aizawa et al., the content of which is hereby incorporated by reference as if set forth in its entirety.

The non-polymerizable contaminants present in the polymer which may be introduced via the monomer will depend, in part, on the particular monomer selected for polymer preparation. For example, high levels of acetamide may be present in the NVAM. In addition to such raw materials used to prepare the monomers, non-polymerizable intermediate compounds generated during manufacture of the monomer may be present at high levels. In addition, by-products of monomer preparation, for example degradation products, may be present at high levels in the monomer. Non-polymerizable raw materials, intermediates and by-products which may be present will depend, not only on the particular monomer of selection, but also on the method used to prepare the monomer.

In addition to contaminants resulting from monomer selection, non-polymerizable contaminants also may be introduced to the polymer via the polymerization process itself. For instance, polymers may contain residual chain transfer agents or polymerization initiators, such as free-radical initiators, which are used in preparing the polymers. Accordingly, chain transfer agents, polymerization initiators and the like preferably should be selected such that they are soluble in the diluent. The materials preferably are selected such that they and their by-products are suitable for end-uses such as cosmetics and pharmaceuticals.

In addition to its solubility in the diluent, selection of the polymerization initiator may be a factor in further reducing the level of non-polymerizable contaminants, as decomposition or combination products resulting from the inefficient utilization of the polymerization initiators could result in higher residual non-polymerizable contaminant levels. Therefore, the initiator is selected to enable rapid conversion of the monomer to the polymer, thus limiting decomposition or combination reactions which may occur during polymerization. Preferably, the initiator is selected to enable rapid conversion of the NVAM to PVAM. Particular combinations of diluent and initiator surprisingly were discovered to provide PVAM with significant reduction in residual non-polymerizable contaminants such as acetamide.

The combination of diluent and initiator should be selected so as to effect polymerization under standard conditions of temperature and pressure. Such temperatures typically range from about 50–100° C. Preferably the selected temperature is near the boiling point of the diluent under standard pressure. The temperature and pressure may deviate from standard conditions under special circumstances, such as the use of volatile components or the necessity to complete certain steps at higher temperature or pressure in order to complete consumption of the initiator.

In order to provide PVAM of high purity, it is preferred to select the diluent used in the polymerization process such that the monomer, the non-polymerizable contaminants present as a result of the monomer, and the non-polymerizable contaminants which may be present due to the polymerization process itself, all are soluble in the diluent. In addition, the polymers prepared from the monomers must be insoluble in the diluent. In this way, not only is the residual monomer level reduced, but the residual non-polymerizable contaminant level also is reduced significantly in the polymer.

In addition to solubility parameters which are critical to the removal of non-polymerizable contaminants, other factors must be considered in selecting the diluent of choice. The diluent must not be a tackifier for the particular polymer being prepared, i.e., the polymer must not be swellable in the diluent. Furthermore, the diluent preferably is selected based on its suitability for use in end-uses such as cosmetics and pharmaceuticals.

As noted herein above, selection of which diluent to be used will depend, in part, on the particular monomer selected for polymer preparation. For NVAM, preferred diluents include ethyl acetate and acetone, with ethyl acetate being more preferred. Also as noted herein above, the method of monomer preparation is important in selecting the diluent, as the intermediates and by-products generated during preparation of the monomer may vary depending on the particular method used to prepare the monomer.

The polymerization medium itself comprises the diluent selected from the group consisting of ethyl acetate and acetone and a polymerization initiator as described herein. The polymerization medium may comprise other polymerization aids or ingredients, such as chain transfer agents. The polymerization medium must not contain water in amounts which are effective to dissolve the PVAM, although minor amounts of water may be used, for instance, where polymerization aids or ingredients must first be dispersed or dissolved into water prior to incorporation into the polymerization medium. It is essential, however, to maintain a PVAM precipitate in the polymerization medium prior to the substantial isolation thereof from the polymerization medium.

Once the polymer is precipitated into the polymerization medium, the polymer is isolated from the polymerization medium which comprises the diluent and any residual polymerization ingredients, for example polymerization initiators or transfer agents. Isolation may be by any of the conventional methods used in precipitation polymerization processes. The polymer may be dried to a powder form having low residual diluent, or in certain cases the polymer may be isolated to the extent that a polymer cake comprising substantially isolated polymer and diluent. The cake may be used as is or treated further as below.

Using the precipitation polymerization process of this invention with selected diluent, particularly ethyl acetate, results in the preparation of high purity polymers having reduced levels of non-polymerizable contaminants of less than about 4000 parts per million (ppm) and preferably less than about 2000 ppm. This method further results in residual acetamide levels of less than about 2000 ppm, preferably less than about 1000 ppm and more preferably less than about 500 ppm.

In certain embodiments of the invention, the precipitated polymer, whether in dried or wet cake form, i.e., isolated or substantially isolated, may be washed with acetone. The polymer is contacted with a sufficient amount of the acetone and under conditions which are effective to further reduce the level of non-polymerizable contaminants, particularly residual acetamide. The acetone may be added to the isolated or substantially isolated polymer. Preferably, the acetone is added to the polymerization vessel subsequent to the substantial removal of the polymerization medium therefrom. As the polymer precipitate generally is prepared at about 20 weight percent polymer solids, based on total weight of the polymerization medium and precipitated polymer, the preferred wash method comprises adding acetone to the substantially isolated polymer in the polymerization vessel such that the acetone wash comprises about 20 weight percent polymer and about 80 weight percent acetone.

Alternately, the isolated or substantially isolated polymer may be discharged from the polymerization vessel and transferred to the acetone wash. In either situation, the relative amounts of acetone and polymer should be such that reduction of non-polymerizable contaminants such as acetamide are reduced, compared to polymers prepared similarly but without the acetone wash.

When using the embodiment of an acetone wash described above, the non-polymerizable contaminants are reduced to less than about 2000 ppm, preferably less than about 1000 ppm and the residual acetamide is reduced to less that about 1000 ppm, preferably less that about 500 ppm, and more preferably, less than about 300 ppm.

The following examples are intended to exemplify the invention and should not be construed as limiting the metes and bounds of the invention, which are set forth by the claims appended hereto.

Precipitation Polymerization of NVAc

A. In a 2-l flask equipped with a condenser were introduced 22.5 g of NVAM, 225 g of diluent, and, over a 5 minute period, 0.9 mmol of initiator. Two slow-adds were added 10 minutes later, the first one consisting of 177.5 g of NVAM and 458.5 g of diluent and the second one consisting of 5.4 mmol of initiator and 63.5 g of diluent. The slow-adds were added over periods of 3 and 6 hours, respectively, while maintaining reflux in the reaction system. The reaction was continued for one more hour before filtration of the mixture. The precipitated polymer was dried in a heated oven to remove the diluent.

Using ethyl acetate as the diluent and t-amylperoxy pivalate (t-APP) as an initiator in the above process, a residual acetamide level of 1,000 ppm was obtained (Example 1). Subsequent to polymerization, the polymerization medium was removed from the polymer precipitate and replaced with acetone. The acetone then was discharged from the flask and the polymer isolated therefrom. Washing of the precipitated polymer of Example 1 with acetone further reduced the acetamide level to 265 ppm (Example 1(a)). Using acetone as the diluent and t-APP as the initiator 14,000 ppm residual acetamide was reported (Example 2). Using acetone as the diluent and α-cumyl peroxyneodecanoate (α-CPD) as the initiator, 5,000 ppm residual acetamide was reported (Example 3).

B. In a 2-L flask equipped with a condenser were introduced 22.5 g of NVAM and 225 g of ethyl acetate, and, over a 5 minute period, 0.22 g of t-APP in 25 g of ethyl acetate. A slow-add consisting of 177.5 g of NVAM and 458.5 g of ethyl acetate was added 10 minutes later. It was added over a period of 2.5 hours. A second slow-add was started 1.5 hours after the beginning of the first slow-add. The second slow-add consisted of 1.36 g of t-APP in 63.5 g of ethyl acetate. This addition was conducted over a 4 hour period. Reflux was maintained during the slow-additions. At the end of the second slow-add, the mixture was maintained at reflux for an additional hour. The resulting precipitate was filtered to generate a wet polymer cake, which then was dried and analyzed for residual acetamide. The polymer was found to contain 340 ppm of residual acetamide (Example 4). Subsequent to polymerization, the polymerization medium was removed from the polymer precipitate and replaced with acetone. The acetone then was discharged from the flask and the polymer isolated therefrom. Subsequent washing of the wet cake in acetone further reduced residual acetamide in the dried polymer to 200 ppm (Example 4(a)).

C. A PVAM was prepared similar to Example 2, except that the initial charge content was brought to reflux prior to the addition of the initiator. Subsequent to polymerization, the polymerization medium was removed substantially from the flask, thereby substantially isolating the polymer precipitate from the polymerization medium, after which the polymer precipitate was subjected to multiple acetone-washings. The acetone-washed polymer precipitate then was dried and analyzed for residual formamide (Example 5).

D. A PVAM was prepared similar to example B, except that only one-third of the amount of initiator as was used in Example B was used, and an additional 100 ml of diluent were added at the end of the second slow-add. Subsequent to polymerization, the polymerization medium was removed substantially from the flask, thereby substantially isolating the polymer precipitate from the polymerization medium. A sample of the substantially isolated, precipitated polymer was dried and analyzed for residual formamide (Example 6). To the balance of the precipitated polymer in the flask were added an amount of acetone effective to dissolve residual formamide, thereby forming a slurry of the polymer in the acetone. The acetone then was discharged from the flask and the substantially isolated polymer precipitate dried. The dried polymer was analyzed for residual formamide (Example 6(a)).

TABLE 1

| Example | diluent | initiator | residual acetamide (ppm) |
|---------|---------------|-----------|--------------------------|
| 1       | ethyl acetate | t-APP     | 1,000                    |
| 1(a)*   | ethyl acetate | t-APP     | 265                      |
| 2       | acetone       | t-APP     | 14,000                   |
| 3       | acetone       | α-CPD     | 5,000                    |
| 4       | ethyl acetate | t-APP     | 340                      |
| 4(a)*   | ethyl acetate | t-APP     | 200                      |
| 5       | acetone       | t-APP     | 1,000                    |
| 6       | ethyl acetate | t-APP     | 460                      |
| 6(a)*   | ethyl acetate | t-APP     | 280                      |

*acetone wash following isolation of precipitated polymer

We claim:

1. A precipitation polymerization process for the manufacture of essentially non-crosslinked polymers prepared from N-vinyl acetamide monomer, which have reduced levels of non-polymerizable contaminants comprising:
   contacting the N-vinyl acetamide monomer with a polymerization medium comprising an ethyl acetate diluent and a free-radical initiator, under conditions effective to polymerize the N-vinyl acetamide monomer, thereby forming a precipitate of poly (vinyl acetamide) in the polymerization medium, and
   isolating the precipitated poly(vinyl acetamide) from the polymerization medium, the non-polymerizable contaminant level being 1000 ppm, or less.

2. The process of claim 1 wherein the N-vinyl acetamide monomer is present at levels ranging from 100 weight percent to about 10 weight percent, based on the total weight of monomers used to prepare the polymers.

3. The process of claim 2 wherein the free-radical initiator is selected from the group consisting of α-cumyl peroxyneodecanoate and t-amyl peroxy pivalate.

4. The process of claim 3 wherein the level of non-polymerization contaminants is less than about 2000 ppm.

5. The process of claim 1 further comprising the steps of contacting the precipitated poly(vinyl acetamide) with an amount of acetone and under conditions effective to wash the precipitated poly(vinyl acetamide) and further reduce the level of non-polymerizable contaminants to 1000 ppm or less, and isolating the washed, precipitated poly(vinyl acetamide) from the acetone.

6. A precipitation polymerization process for the manufacture of essentially non-crosslinked polymers prepared from N-vinyl acetamide monomer and which have reduced levels of residual acetamide comprising:

contacting N-vinyl acetamide monomer with a polymerization medium comprising an ethyl acetate diluent and a free-radical initiator, under conditions effective to polymerize N-vinyl acetamide, thereby forming a precipitate of poly(vinyl acetamide) in the polymerization medium, and isolating the precipitated poly(vinyl acetamide) from the polymerization medium, the level of residual acetamide being less than about 2000 ppm.

7. The process of claim 6 wherein the N-vinyl acetamide monomer is present at levels ranging from 100 weight percent to about 10 weight percent, based on the total weight of monomer used to prepare the polymers.

8. The process of claim 7 wherein the free-radical initiator is selected from the group consisting of α-cumyl peroxyneodecanoate and t-amyl peroxy pivalate.

9. The process of claim 8 wherein the level of residual acetamide is less than about 1000 ppm.

10. The process of claim 8 wherein the level of residual acetamide is less than about 500 ppm.

11. The process of claim 6 further comprising the steps of contacting the precipitated poly(vinyl acetamide) with an amount of acetone and under conditions effective to wash the precipitated poly(vinyl acetamide) and further reduce the level of residual acetamide to less than about 1000 ppm, and isolating the washed, precipitated poly(vinyl acetamide) from the acetone.

12. The process of claim 11 wherein the N-vinyl acetamide monomer is present at levels ranging from 100 weight percent to about 10 weight percent, based on the total weight of monomer used to prepare the polymers.

13. The process of claim 12 wherein the free-radical initiator is selected from the group consisting of α-cumyl peroxyneodecanoate and t-amyl peroxy pivalate.

14. The process of claim 12 wherein the level of residual acetamide is less than about 500 ppm.

15. The process of claim 13 wherein the level of residual acetamide is less than about 300 ppm.

* * * * *